United States Patent Office 3,264,014
Patented August 2, 1966

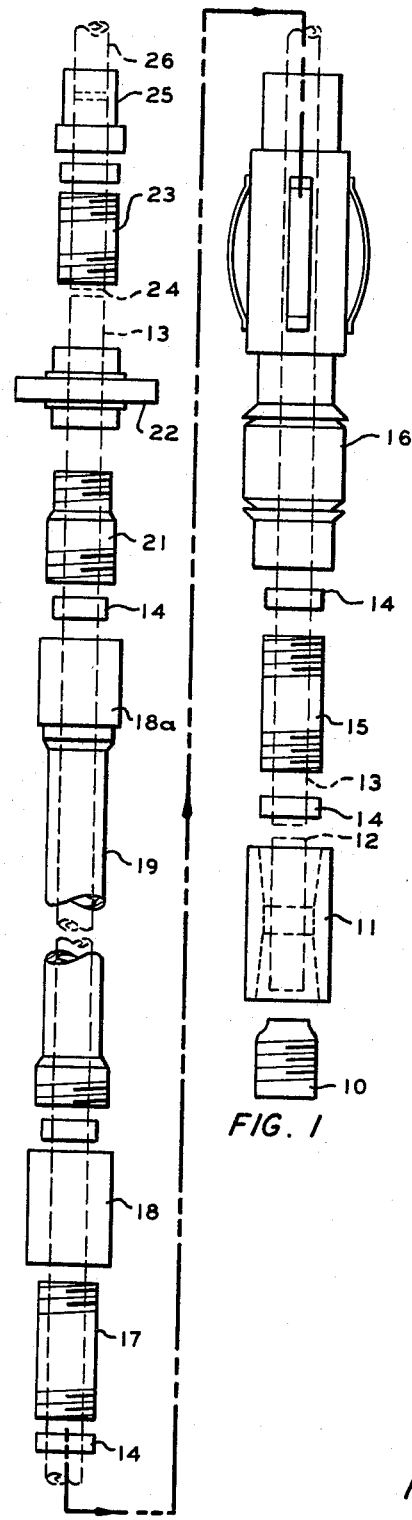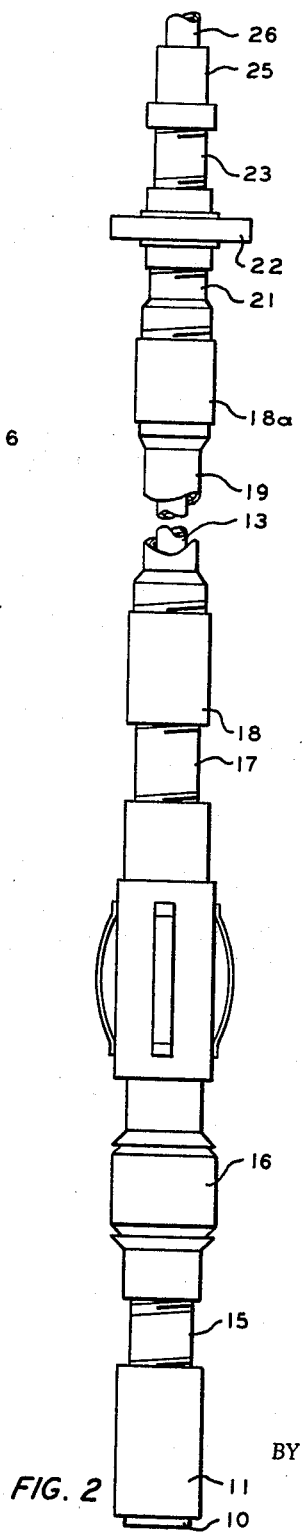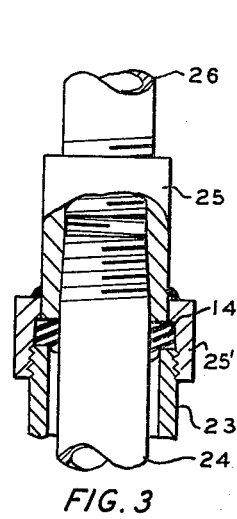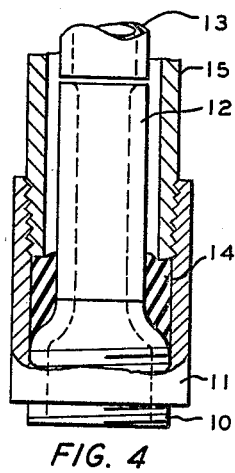

---

3,264,014
PLASTIC-LINED CONDUIT
Harry M. Brown, Shidler, Okla., assignor to Phillips Petroleum Company, a corporation of Delaware
Filed Jan. 9, 1964, Ser. No. 336,698
4 Claims. (Cl. 285—55)

This invention relates to plastic-lined conduits. In one aspect the invention relates to terminating a plastic liner in a conduit. In another aspect the invention relates to sealing the annulus between a conduit and the terminal end of the liner. In still another aspect the invention relates to anchoring the terminal end of a plastic liner in a conduit.

It is known to employ plastic and other corrosion-resistant materials as liners in pressure-resistant conduits. One major problem encountered in lining a pressure-resistant conduit is that of terminating the liner in the conduit so as to anchor the liner and seal the annulus between the liner and conduit. Means which have been proposed have been generally unsatisfactory because of being limited to low-pressure operation, being excessively bulky, or being too complex for use in field operations.

It is an object of the present invention to provide means to terminate a plastic liner in a conduit which is simple, economical and reliable. It is also an object to provide means to seal the end of a plastic liner to the conduit enclosing the liner. Another object is to provide means to anchor the terminal end of a plastic liner in a threadedly coupled conduit so as to seal the annulus between the liner and conduit. A further object of the invention is to provide means to seal the terminal end of a plastic liner in a conduit so that the outside dimensions of the conduit are not affected. Other objects and advantages of the invention will be apparent to those skilled in the art upon study of the disclosure including the detailed description of the invention and the attached drawing wherein:

FIGURE 1 is an exploded view of the pipe and liner assembly of the invention;

FIGURE 2 is an elevational view of the completed assembly;

FIGURE 3 is a partial sectional view of the top connection; and

FIGURE 4 is a partial sectional view of the bottom connection.

Broadly, the invention contemplates an assembly comprising a fitting into which the end of the plastic liner and the end of the conduit are threaded so that the fitting seals the annulus between the liner and the conduit and the liner is anchored to the conduit. The fitting, in its simpler form, can be a coupling for the conduit with a plastic reducing nipple threaded into the coupling so that the smaller end of the reducing nipple extends through the coupling. The plastic liner is then welded onto the small end of the reducing nipple and the conduit is then threaded into the coupling about the reducing nipple. A resilient gasket ring is placed about the reducing nipple to occupy the annular space between the nipple and the coupling. It should be noted that the threads are cut on the reducing nipple in reverse direction. The threads are tapered and are cut so that the small end of the reducing nipple is inserted into the coupling. The threads need extend only far enough on the reducer to make up snugly in the coupling. This will, of course, depend on the length of the reducer with respect to the coupling.

An assembly within the broad concept of the invention also comprises a fitting described as a combination coupling having two sets of internal threads at one end so that the plastic liner is threaded into one set of threads and the metal conduit is threaded into the other set of threads. A ring gasket encircles the plastic liner between the sets of threads. The combination coupling can be fabricated by welding, or otherwise securing, a coupling for the conduit onto a coupling having threads to mate with threads on the plastic liner. A conduit coupling can be cut in half to facilitate welding onto the smaller coupling as indicated in FIGURE 3 of the drawing.

A rubber hose of suitable diameter can be cut into rings of desired length to occupy the space between conduit ends in the couplings of the conduit and in the terminal fittings.

Reference is now made to FIGURE 1 of the drawing where the tubing assembly with its thermoplastic liner will be described. Beginning at the bottom of the assembly, a thermoplastic swage 10 having external threads to match those of coupling 11 is welded to an extra-heavy thermoplastic nipple 12 and is then threaded into coupling 11 so that the thermoplastic nipple projects through the coupling 11 and out at the opposite end. The extra-heavy thermoplastic nipple 12 has an internal taper at the end so that when fused to the regular thermoplastic liner section 13, a smooth transition joint results between the two sections of thermoplastic liner of different internal diameters. A rubber spacer ring 14 is placed over the plastic liner 13 and a steel nipple 15 is then threaded into steel coupling 11 so that the spacer 14 fills the annulus between the coupling 11 and the plastic nipple 12 and between the end of the steel nipple 15 and the enlarged portion of the thermoplastic swage 10. A rubber spacer ring 14 is placed over the thermoplastic liner 13 above the steel nipple 15 and the packer 16 is threaded onto steel nipple 15. The length of the steel nipple 15 determines the length of plastic-lined tubing which extends below the packer 16. A steel nipple 17 is then threaded into the top of the packer 16 with another spacer 14 and a steel coupling 18 is then threaded onto the steel nipple 17. Sections of steel tubing 19 are then run into the well with a spacer ring 14 in each coupling to occupy the annulus in the coupling between the ends of the sections of tubing. Sections of thermoplastic liner 13 are fused together and run into the well simultaneously with the sections of tubing so that the tubing with its packer assembly contains a continuous liner of thermoplastic from the swage 10 to the top of the tubing where a combination or reducing steel nipple 21, having threads on one end to mate with the threads in the tubing coupling 18a at the top of the string of tubing and regular pipe threads on the other end, is threaded into coupling 18a with a spacer ring 14 as in each of the couplings. One half of a standard union fitting 22 is threaded onto the combination nipple 21 and the other half of the union 22 is threaded onto a standard steel nipple 23. A second extra-heavy thermoplastic nipple 24, similar to extra-heavy thermoplastic nipple 12, is fused at its tapered end to the top of the thermoplastic liner 13. The other end of the thermoplastic nipple 24 is threaded so as to mate with the internal threads of combination coupling 25. Combination coupling 25 is fabricated so as to have two sets of threads in one end, 25', so that one set of threads matches those of the themoplastic nipple 24 and the other set of threads matches those of steel nipple 23. Thus, when the liner 13 and the nipple 24 are threaded into the coupling 25; the steel nipple 23 is threaded into the coupling 25; and the two halves of the union 22 are threaded together, the string of steel tubing and its thermoplastic liner are terminated simultaneously at the well head. A corrosion-resistant, e.g., stainless steel, standard nipple 26 can then be threaded into the combination coupling 25 so as to provide a means for connecting the tubing to a pipe line, storage tank or other equipment desired to be connected to the tubing.

FIGURE 2 is an elevational view of the completed assembly.

Details of the top and bottom connections are shown in FIGURES 3 and 4.

The following specific embodiment of the invention will be helpful in attaining a better understanding of the invention but should not be construed as unduly limiting the invention.

The fitting assembly of FIGURE 4 was used as the bottom terminal seal in each of 17 salt water injection wells in a water flood secondary recovery project in Osage County in Oklahoma. The fitting assembly of FIGURE 3 was used at the top of each well. The bottom connection was a 2.375-inch O.D. x 1.9-inch O.D. plastic reducer threaded into a 2.375-inch steel tubing coupling. The top end of the plastic liner was threaded to fit a 1.5-inch forged steel coupling. One-half of a 2-inch steel coupling was welded onto the 1.5-inch coupling. A 2-inch steel nipple and a 2-inch union were threaded into the 2-inch coupling. The liner was threaded into the 1.5-inch coupling and then the union was made up to complete the connection. Corrosion-resistant pipe threaded into the other end of the 1.5-inch coupling supplied salt water to the well.

These 17 wells have operated satisfactorily and tubing corrosion has been substantially eliminated.

That which is claimed is:

1. A thermoplastic lined steel tubing assembly positioned in a well bore comprising
    a plurality of threaded steel tubing sections connected together by threaded steel couplings and terminating at the bottom with a threaded steel terminal coupling;
    a plurality of thermoplastic tubing sections positioned in said steel tubing and welded together and terminating at the bottom with a thermoplastic reducing nipple threaded into the open end of the threaded steel terminal coupling with the smaller end of said nipple extending through said coupling and welded to said plurality of thermoplastic sections;
    a steel combination coupling attached to the upper end of said plurality of steel tubing sections, said combination coupling having in one end thereof a theaded bore and a threaded counter bore, the upper terminal end of said thermoplastic tubing threadedly secured in said bore and the upper terminal end of said threaded steel tubing being threadedly secured in said counter bore.

2. The lined steel tubing assembly of claim 1 wherein a stainless steel tube is threaded into the second end of the combination coupling.

3. The lined steel tubing assembly of claim 1 wherein a resilient spacer ring is positioned in the annulus between the liner and each threaded steel coupling.

4. The lined steel tubing assembly of claim 1 wherein a steel union member is positioned between steel tubing sections adjacent said combination coupling.

References Cited by the Examiner

UNITED STATES PATENTS

| | | | |
|---|---|---|---|
| 1,088,491 | 2/1914 | Waitz | 285—55 |
| 1,112,677 | 10/1914 | Conrader | 285—55 |
| 1,746,132 | 2/1930 | Stokes | 285—140 X |
| 1,953,172 | 4/1934 | Griffiths | 285—55 X |
| 2,366,547 | 1/1945 | Oak | 285—138 X |
| 2,487,939 | 11/1949 | Norton | 285—348 X |
| 2,703,144 | 3/1955 | Clifford | 285—133 |
| 2,926,701 | 3/1960 | Campbell | 285—55 X |
| 2,982,311 | 5/1961 | Haskell | 285—55 X |

CARL W. TOMLIN, *Primary Examiner.*

R. GIANGIORGI, *Assistant Examiner.*